US011312507B2

(12) United States Patent
Cheng et al.

(10) Patent No.: US 11,312,507 B2
(45) Date of Patent: Apr. 26, 2022

(54) REPAIR ASSEMBLY TO REPAIR AN AREA ON A MEMBER OF A VEHICLE

(71) Applicant: The Boeing Company, Chicago, IL (US)

(72) Inventors: Stacy Cheng, Mill Creek, WA (US); Jay Patel, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 421 days.

(21) Appl. No.: 16/558,990

(22) Filed: Sep. 3, 2019

(65) Prior Publication Data

US 2021/0061491 A1 Mar. 4, 2021

(51) Int. Cl.
*B64F 5/40* (2017.01)
*B64C 1/12* (2006.01)
*B23P 6/00* (2006.01)

(52) U.S. Cl.
CPC ............. *B64F 5/40* (2017.01); *B64C 1/12* (2013.01); *B23P 6/00* (2013.01); *Y10T 29/49735* (2015.01); *Y10T 29/49739* (2015.01)

(58) Field of Classification Search
CPC ......... Y10T 29/49732; Y10T 29/49734; Y10T 29/49735; Y10T 29/49739; Y10T 29/49741; B23P 2700/01; B23P 6/00; B64F 5/40; B64C 3/28
See application file for complete search history.

(56) References Cited

U.S. PATENT DOCUMENTS

| 2,091,082 A | * | 8/1937 | Osolin | B23P 6/04 220/561 |
| 3,168,144 A | * | 2/1965 | Capowich | B64C 27/46 416/226 |
| 3,661,683 A | * | 5/1972 | Engel | B29C 73/00 156/580 |
| 4,517,038 A | * | 5/1985 | Miller | B29C 73/10 156/94 |
| 4,588,626 A | * | 5/1986 | Cologna | B29C 73/14 156/94 |
| 4,667,906 A | * | 5/1987 | Suarez | B64C 3/28 244/117 A |
| 4,738,594 A | * | 4/1988 | Sato | F04D 29/388 416/213 A |

(Continued)

OTHER PUBLICATIONS

Aviation Safety Bureau, "Advanced Composite Materials", Aviation Maintenance Technician, Airframe Handbook, 2014, pp. 1-60, vol. 1, chapter 7.

(Continued)

*Primary Examiner* — Jason L Vaughan
(74) *Attorney, Agent, or Firm* — Coats & Bennett, PLLC

(57) ABSTRACT

Methods and assemblies for repairing an identified area on a member of a vehicle. A first doubler plate is positioned over a first side of the identified area of the member. A second doubler plate is positioned over an opposing second side of the identified area of the member. A first plurality of fasteners are inserted through the identified area and each of the first and second doubler plates and secured. A second plurality of fasteners are inserted through the first and second doubler plates and the member at points away from the identified area and secured.

20 Claims, 8 Drawing Sheets

(56) References Cited

U.S. PATENT DOCUMENTS

| | | | | |
|---|---|---|---|---|
| 4,858,853 | A * | 8/1989 | Westerman | B64F 5/40 244/119 |
| 4,895,491 | A * | 1/1990 | Cross | F04D 29/388 244/123.9 |
| 5,023,987 | A * | 6/1991 | Wuepper | B23P 6/00 156/98 |
| 5,129,346 | A * | 7/1992 | Smith | B63H 25/50 114/162 |
| 5,424,105 | A * | 6/1995 | Stewart | B29C 73/10 244/119 |
| 5,941,446 | A * | 8/1999 | Yasui | B23K 31/02 228/157 |
| 5,958,166 | A * | 9/1999 | Walters | B29C 73/32 156/94 |
| 6,770,349 | B2 * | 8/2004 | Itoh | B29C 73/04 428/73 |
| 6,779,757 | B2 * | 8/2004 | Thomas, Jr. | B64C 3/28 244/123.1 |
| 7,303,374 | B2 * | 12/2007 | Li | B64C 27/473 29/889.6 |
| 8,091,229 | B2 * | 1/2012 | Deak | F03D 80/50 29/889.1 |
| 8,826,534 | B2 * | 9/2014 | Cappelli | B29C 73/10 29/889.1 |
| 9,222,362 | B2 * | 12/2015 | Ford | F01D 5/147 |
| 2013/0164141 | A1 * | 6/2013 | Lin | F03D 1/0641 416/223 R |
| 2015/0059142 | A1 * | 3/2015 | De Jong | B29C 73/04 29/402.14 |
| 2017/0341774 | A1 * | 11/2017 | Ding | B64C 3/26 |

OTHER PUBLICATIONS

Navy Aviation, "Repairing The Trailing Edge of an Airfoil", pp. 1-2, Retrieved from the internet: URL: http://navyaviation.tpub.com/14018/css/Repairing-The-Trailing-Edge-Of-An-Airfoil-591.htm [retrieved on Jun. 25, 2019].

TPUB, "Types of Advanced Composite Materials", pp. 1-3, Retrieved from the internet: URL: http://www.tpub.com/air/14-12.htm [retrieved on Jun. 25, 2019].

Gupta, V., et al., "Repair of Damage with Composites", Mechanical Engineering Department, CH. Devi Lal State Institute of Engineering and Technology, Mar. 24, 2017, pp. 1-26, Sirsa, India.

* cited by examiner

REPAIR ASSEMBLY TO REPAIR AN AREA ON A MEMBER OF A VEHICLE

TECHNOLOGICAL FIELD

The present disclosure relates generally to the field of repairing a member and, more specifically, to repairing a member on a vehicle to provide for the vehicle to remain in service.

BACKGROUND

Vehicles include members that are formed from two or more different layers that are connected together. One example is a flight control member of an aircraft that controls the flight of the aircraft. The flight control members can be constructed from first and second panels that are connected together by fasteners.

One or more areas on the members can be identified as needing repair. The repair may be necessary due to a variety of different events, such as a flight control member that is damaged during a lightning strike or becomes worn after prolonged use. The vehicle may not be usable until the identified area is repaired.

As such, there is a need for the ability to repair an identified area of a member in a timely manner and at various locations to allow the vehicle to be used.

SUMMARY

One aspect is directed to a method of repairing an identified area on a member of a vehicle. The method comprises positioning a first doubler plate over a first side of the identified area of the member. The method includes positioning a second doubler plate over an opposing second side of the identified area of the member. The method includes extending a first plurality of fasteners through the identified area and each of the first and second doubler plates and securing the first plurality of fasteners. The method includes extending a second plurality of fasteners through each of the first and second doubler plates and the member at points away from the identified area and securing the second plurality of fasteners.

In another aspect, the method further comprises applying an adhesive between each of the first and second double plates and the member and securing the first and second doubler plates to the member.

In another aspect, the method further comprises forming a ramp with the adhesive at leading edges of the first and second doubler plates.

In another aspect, the method further comprises aligning a trailing edge of each of the first and second doubler plates with a trailing edge of the member.

In another aspect, the method further comprises positioning leading edges of each of the first and second doubler plates outward beyond a front edge of the identified area, and positioning first and second lateral edges of each of the first and second doubler plates outward beyond lateral edges of the identified area.

In another aspect, the method further comprises positioning washers along each of the first plurality of fasteners at the identified area.

In another aspect, the method further comprises aligning each of the first and second plurality of fasteners in a straight line along a trailing edge of the member.

One aspect is directed to a method of repairing an identified area on a member of a vehicle. The method comprises removing existing fasteners from an identified area and one or more adjacent areas of the member with the existing fasteners extending through holes in the member. The method includes positioning a first doubler plate on a first side of the member and a second doubler plate on an opposing second side of the member with each of the first and second doubler plates extending over the identified area and the one or more adjacent areas of the member. The method includes inserting one or more new fasteners through the holes in the identified area and the first and second doubler plates and securing the first and second doubler plates to the member. The method includes inserting one or more of the new fasteners through the holes in the one or more adjacent areas of the member and the first and second doubler plates and securing the first and second doubler plates to the member.

In another aspect, the method further comprises aligning holes in the first and second doubler plates with the holes in the member and inserting the new fasteners through the aligned holes.

In another aspect, the method further comprises aligning each of the new fasteners in a straight line along the member.

In another aspect, the method further comprises inserting washers along each of the one or more new fasteners in the identified area and not along the one or more new fasteners in the one or more adjacent areas.

In another aspect, the method further comprises aligning trailing edges of each of the first and second doubler plates with a trailing edge of the member.

In another aspect, the method further comprises applying an adhesive between each of the first and second double plates and the member prior to securing the new fasteners.

In another aspect, the method further comprises positioning a head of one or more of the new fasteners outward beyond a surface of the member.

In another aspect, the method further comprises applying tape over a leading edge of each of the first and second doubler plates and adhering a first section of the tape to the member and a second section of the tape to the first and second doubler plates respectively.

One aspect is directed to a repair assembly that extends over first and second opposing sides of an identified area of a member of a vehicle. The repair assembly comprises first and second doubler plates configured to be positioned on the first and second opposing sides of the member and sized to extend over the identified area and one or more adjacent areas. Each of the first and second doubler plates comprises a leading edge, a trailing edge, holes aligned in a row along the trailing edge, and fasteners sized to extend through the holes of each of the first and second doubler plates and the member with the fasteners comprising a head that is larger than the holes. The holes of each of the first and second doubler plates have a common spacing for the holes of the first doubler plate to align with the holes of the second doubler plate when the first doubler plate is positioned on the first side of the member and the second doubler plate is positioned on the second side of the member.

In another aspect, the repair assembly further comprises an adhesive positioned between the first doubler plate and the first side of the member and the second doubler plate and the second side of the member.

In another aspect, the repair assembly further comprises washers positioned on the fasteners that extend through the identified area of the member.

In another aspect, the repair assembly further comprises a ramp positioned at the leading edge of each of the first and second doubler plates with the ramp forming an aerodynamic transition between the repair assembly and the member.

In another aspect, each of the first and second doubler plates comprises an equal shape and size.

The features, functions and advantages that have been discussed can be achieved independently in various aspects or may be combined in yet other aspects, further details of which can be seen with reference to the following description and the drawings.

DETAILED DESCRIPTION

Figure 1:
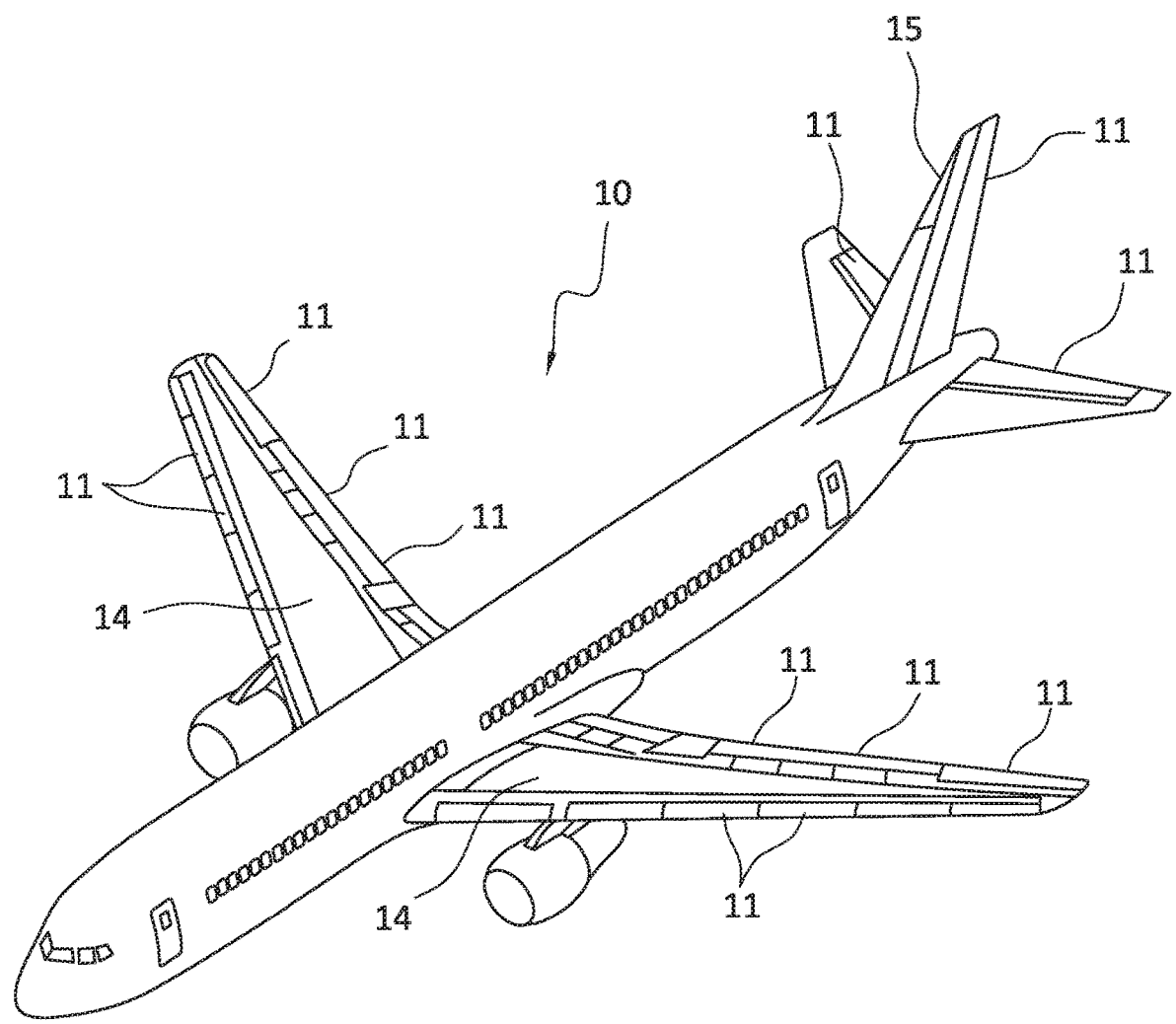
FIG. 1 is a perspective view of a vehicle.

The present application is directed to repairing a member 11 of a vehicle 10. In one example, the repairs can provide a temporary fix until more durable and longer lasting repairs can be made to the identified area. FIG. 1 illustrates one context of use in which the member 11 is a flight control member 11 on an aircraft 10. The flight control member 11 can include but is not limited to a rudder, elevator, aileron, flaperons, and flaps. The flight control members 11 are movably attached to various sections of the aircraft 10 including the wings 14 and tail 15 to change their orientation to control the flight.

Figure 2:
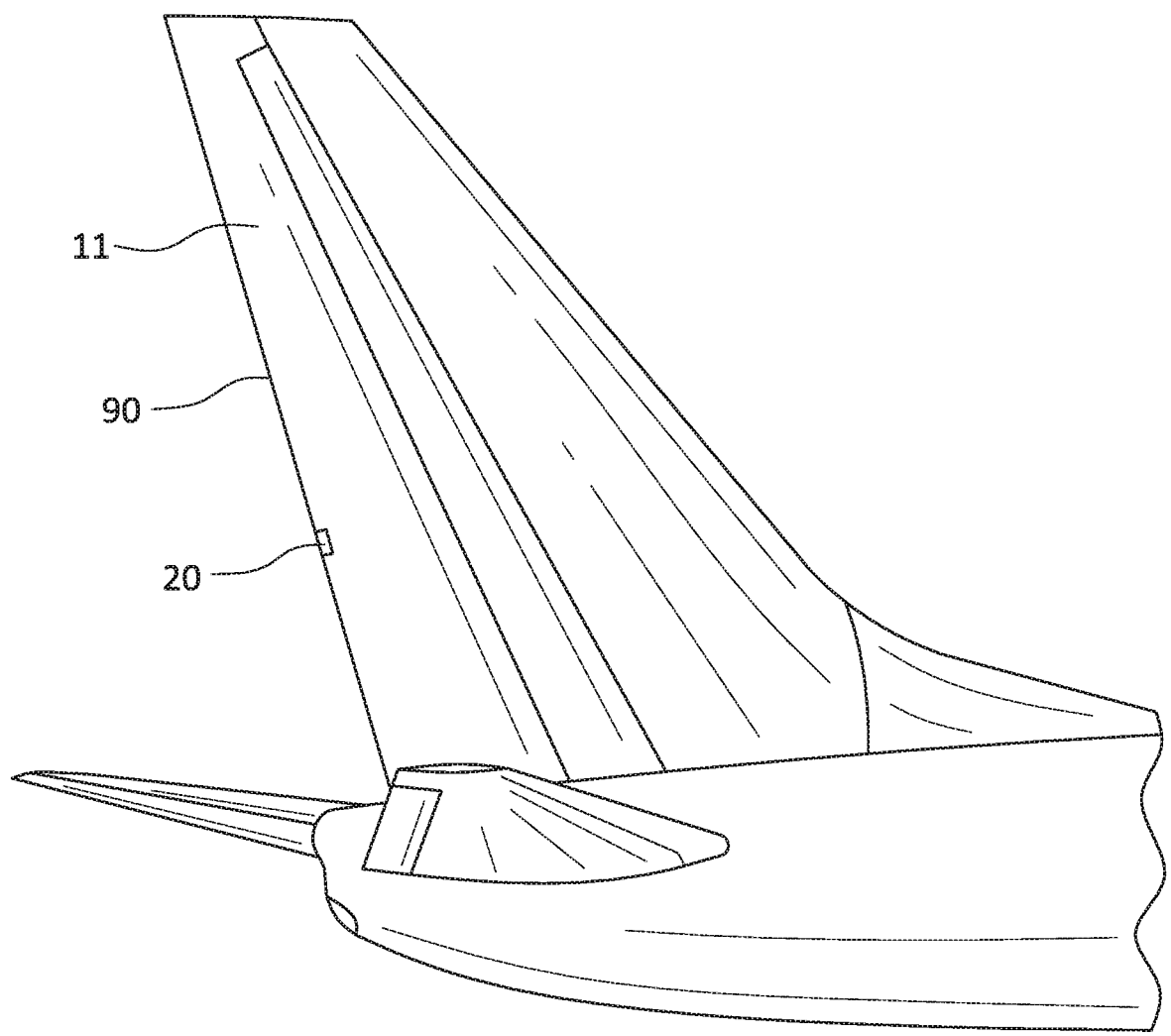
FIG. 2 is a perspective view of a repair assembly connected to a rudder of an aircraft.

FIG. 2 illustrates a repair assembly 20 mounted to a flight control member 11 of an aircraft 10. Specifically, the repair assembly 20 is mounted to a rudder 11 of the aircraft 10. The repair assembly 20 repairs the flight control member 11 to allow the aircraft 10 to remain in use for a period of time until a more permanent repair can be made to fix the identified area 19.

The repair assembly 20 can be used on a variety of members 11 on a vehicle 10. The members 11 can have composite structures that are formed by two or more layers that are connected together by fasteners. One example includes use to repair a flight control member as described above. In one example, the members 11 include two sections with similar construction. For example, a flight control member constructed from first and second panels 12, 13 that are fastened together. Another example is to repair an outer skin of a vehicle. Other examples include but are not limited to the outer skin of the first panel 12, the outer skin of panel 13, and through the thickness of the panels 12, 13.

Figure 3:
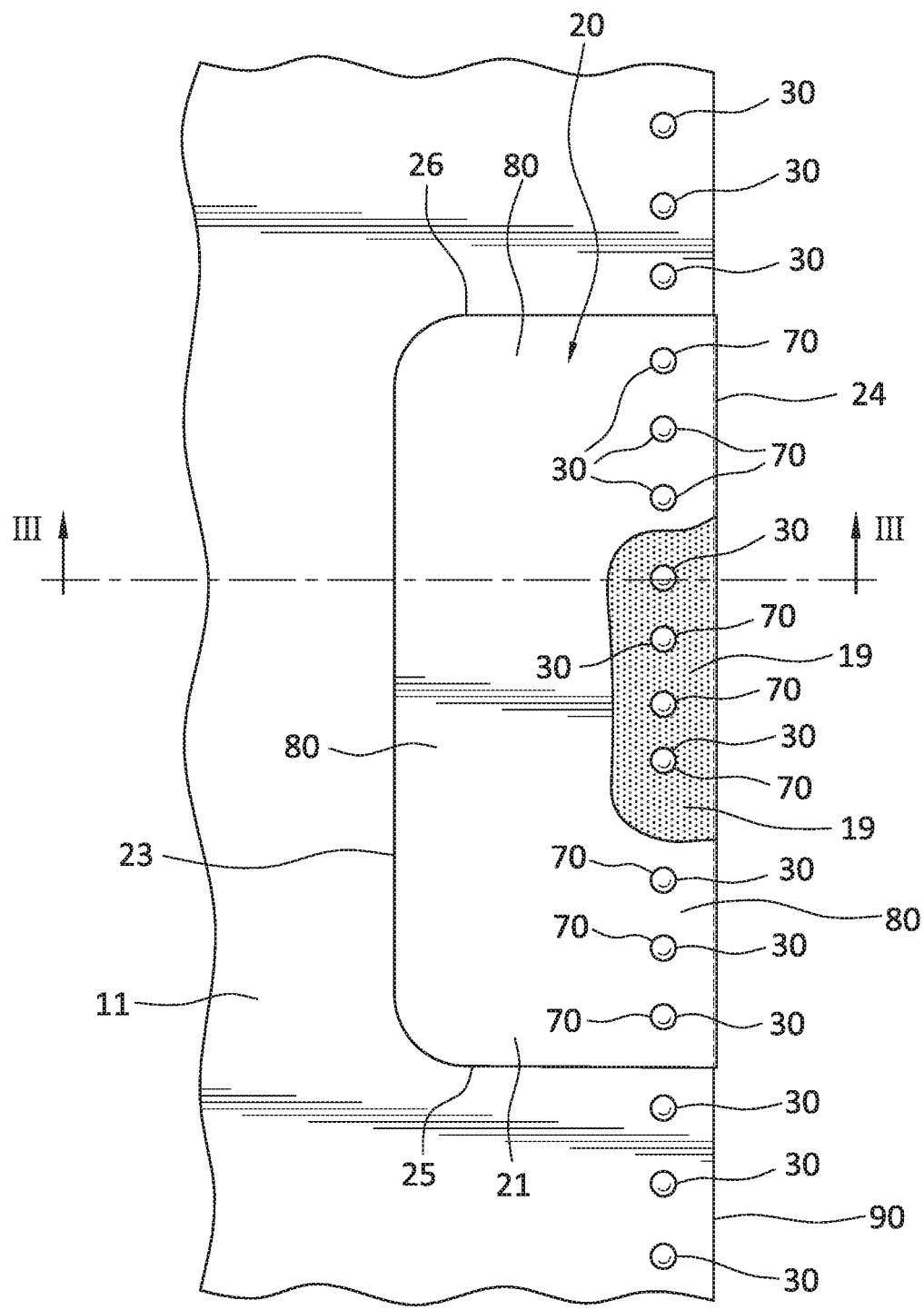
FIG. 3 is a schematic side view of a first doubler plate attached to and positioned on a member.
Figure 4:
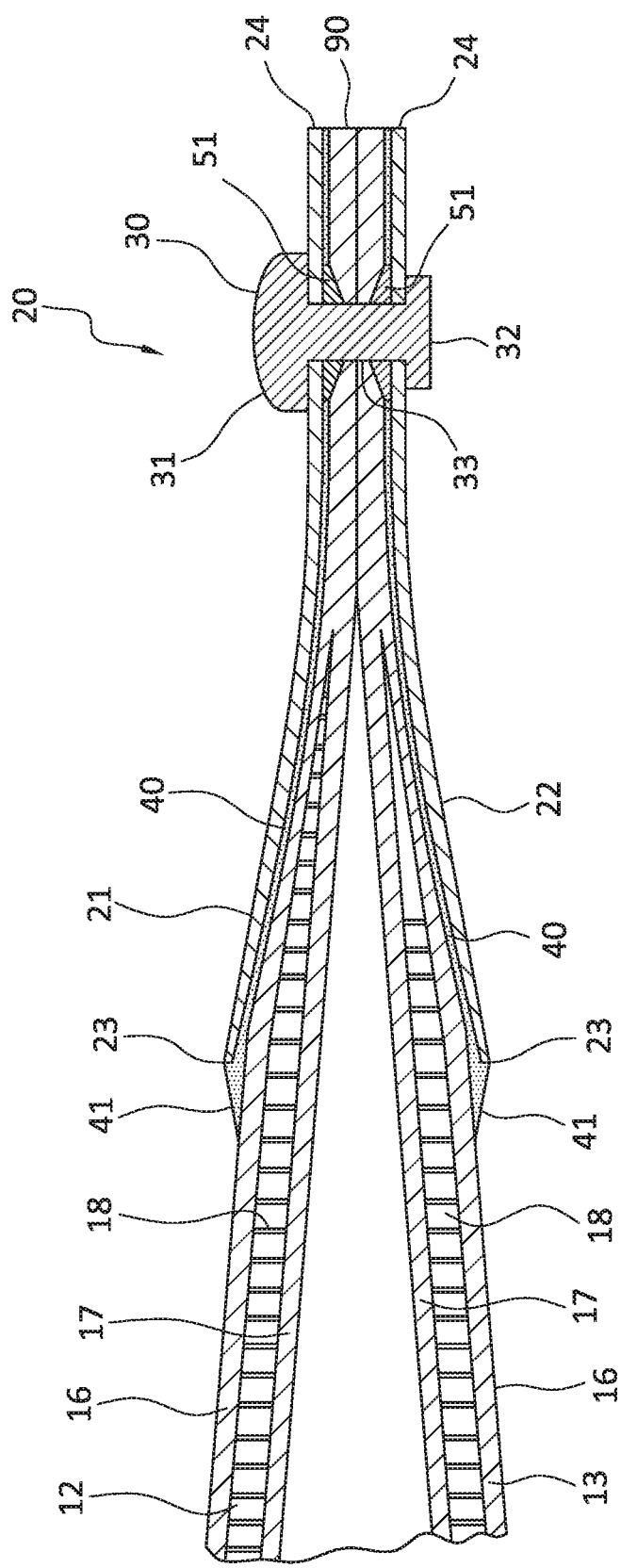
FIG. 4 is a section view cut along line of FIG. 3.

FIGS. 3 and 4 illustrate a repair assembly 20 positioned over an identified area 19 of a member 11. The identified area 19 is determined to be in need of repair due to a variety of different causes. This can include an area that is damaged due to various occurrences, such as but not limited to a lightning strike and wear during prolonged use. The identified area 19 can be determined in a variety of different manners, including but not limited to during a visual inspection of the vehicle 10 (e.g., during a pre-flight inspection), and by instrument readings during use of the vehicle 10. The identified area 19 can be located at various positions along the member 11, and can include various sizes. The identified area 19 can be located along holes 70 that extend through the member 11 and receive fasteners 30 that connect together the different layers. FIG. 3 includes the identified area 19 located in proximity to a trailing edge 90 of the member 11. The identified area 19 extends through a line of fasteners 30 that extend along the trailing edge 90.

The repair assembly 20 includes a first doubler plate 21 mounted on a first side of the member 11. An opposing second doubler plate 22 is mounted on an opposing second side of the member 11. The first and second doubler plates 21, 22 include a leading edge 23, a trailing edge 24, and opposing lateral edges 25, 26. The sizes and shapes of the first and second doubler plates 21, 22 can vary. FIG. 3 includes a substantially rectangular shape with curved corners at the leading edges 23. The trailing edges 24 are straight to align with the trailing edge 90 of the member 11. The first and second doubler plates 21, 22 can include the same or different shapes and/or sizes. The first and second doubler plates 21, 22 can include a variety of thicknesses. The first and second doubler plates 21, 22 can be constructed from a variety of materials, including but not limited to aluminum, corrosion resistant steel (CRES), titanium, thermoplastics, and pre-cured composites. The first and second doubler plates 21, 22 can be constructed from the same or different materials.

The repair assembly 20 is sized to extend completely over the identified area 19. That is, the leading edges 23 and lateral edges 25, 26 of the doubler plates 21, 22 are positioned outward away from the identified area 19. When the identified area 19 is positioned along a trailing edge 90 of the member 11, the trailing edges 24 of the doubler plates 21, 22 are aligned with the trailing edge 90 of the member 11. In another example, the trailing edges 24 of the doubler plates 21, 22 extend outward beyond the trailing edge 90 of the member 11.

In one example, the first and second doubler plates 21, 22 include the same size. The doubler plates 21, 22 are aligned on opposing sides of the flight control member 11 with each of the various edges being aligned (i.e., the leading edges 23 are aligned, trailing edges 24 are aligned, lateral edges 25 are aligned, and lateral edges 26 are aligned). In another example, one or more of the various edges are misaligned. In another example, the first and second doubler plates 21, 22 include different shapes and/or sizes with one or more of the edges being misaligned.

The repair assembly 20 also includes fasteners 30 that extend through the first and second doubler plates 21, 22 and the member 11. The fasteners 30 include a head 31, foot 32, and intermediate shaft 33. Examples of fasteners 30 include but are not limited to rivets, threaded fasteners, hex drive bolts with collars, and bolt/nut combinations. The repair assembly 20 can include a single type of fastener 30, or can include two or more different types of fasteners 30.

The fasteners 30 extend between and connect the first and second doubler plates 21, 22 on the opposing sides of the member 11. One or more of the fasteners 30 extend through the identified area 19 of the member 11, and one or more fasteners 30 extend through the member 11 in one or more adjacent areas that are spaced away from the identified area 19. In the example of FIG. 3, a first set of fasteners 30 extend through the identified area 19. A second set of fasteners 30 extend through a first adjacent area 80 between the identified area 19 and the lateral edge 25. A third set of fasteners 30 extend through an adjacent area 80 between the identified area 19 and the opposing lateral edge 26. The fasteners 30 that extend through these different areas can be the same or different. In one example, at least three fasteners 30 are positioned within each adjacent area 80. This provides for the repair assembly 20 to be securely attached to the member 11. In the embodiment of FIG. 3, three fasteners 30 are positioned along a first adjacent area 80 at the lateral edge 25, and three fasteners 30 are positioned at the adjacent area 80 at the lateral edge 26.

In one example, at least two fasteners 30 extend through the identified area 19. This provides for the repair assembly 20 to be securely attached to the identified area 19. FIG. 3 includes an example with four fasteners 30 extending through the identified area 19.

FIG. 4 includes the member 11 having a composite structure with first and second panels 12, 13 in a layered manner. The two panels 12, 13 include a similar construction as each of the first and second panels 12, 13 include an outer skin 16, an inner skin 17, and an intermediate core 18. The intermediate core 18 tapers down and terminates inward from the trailing edge 90. The member 11 includes a width W measured between the outer skins 16. The width W tapers with a minimum width at the trailing edge 90.

The fasteners 30 are positioned in proximity to the trailing edge 90 of the member 11. In the example of FIG. 4, the fasteners 30 are positioned where the width W is at a minimum with the inner skins 17 being in contact. The head 31 of the fastener 30 that extends outward beyond the first panel 12 and the foot 32 extends outward beyond the second panel 13. In another example, one or both of the head 31 and foot 32 are countersunk within the respective first and second panels 12, 13.

One or more washers 51 can be positioned along the fasteners 30 between the first and second panels 12, 13. The washers 51 provide for securing the fasteners 30. In one example, washers 51 are positioned on just the fasteners 30 within the identified area 19. The other fasteners 30 of the repair assembly 20 do not include washers 51.

An adhesive 40 further secures the first and second doubler plates 21, 22 to the member 11. The adhesive 40 can extend across the entirety of the first and second doubler plates 21, 22, or one or more limited sections. As illustrated in FIG. 4, the adhesive 40 is positioned between the inner side of the doubler plate 21 and the first panel 12, and the inner side of the doubler plate 22 and the second panel 13. Other examples include adhesive 40 positioned at just one of the doubler plates 21 or 22.

A ramp 41 is positioned at each of the leading edges 23 of the first and second doubler plates 21, 22. The ramps 41 can provide an aerodynamic transition from the member 11 to the repair assembly 20. In one example, the ramps 41 are formed by the adhesive 40 that extends outward beyond the doubler plates 21, 22. In another example, the ramps 41 are formed by the leading edges 23 being tapered. The ramps 41 can be the same or different on the opposing sides of the member 11.

Figure 5:
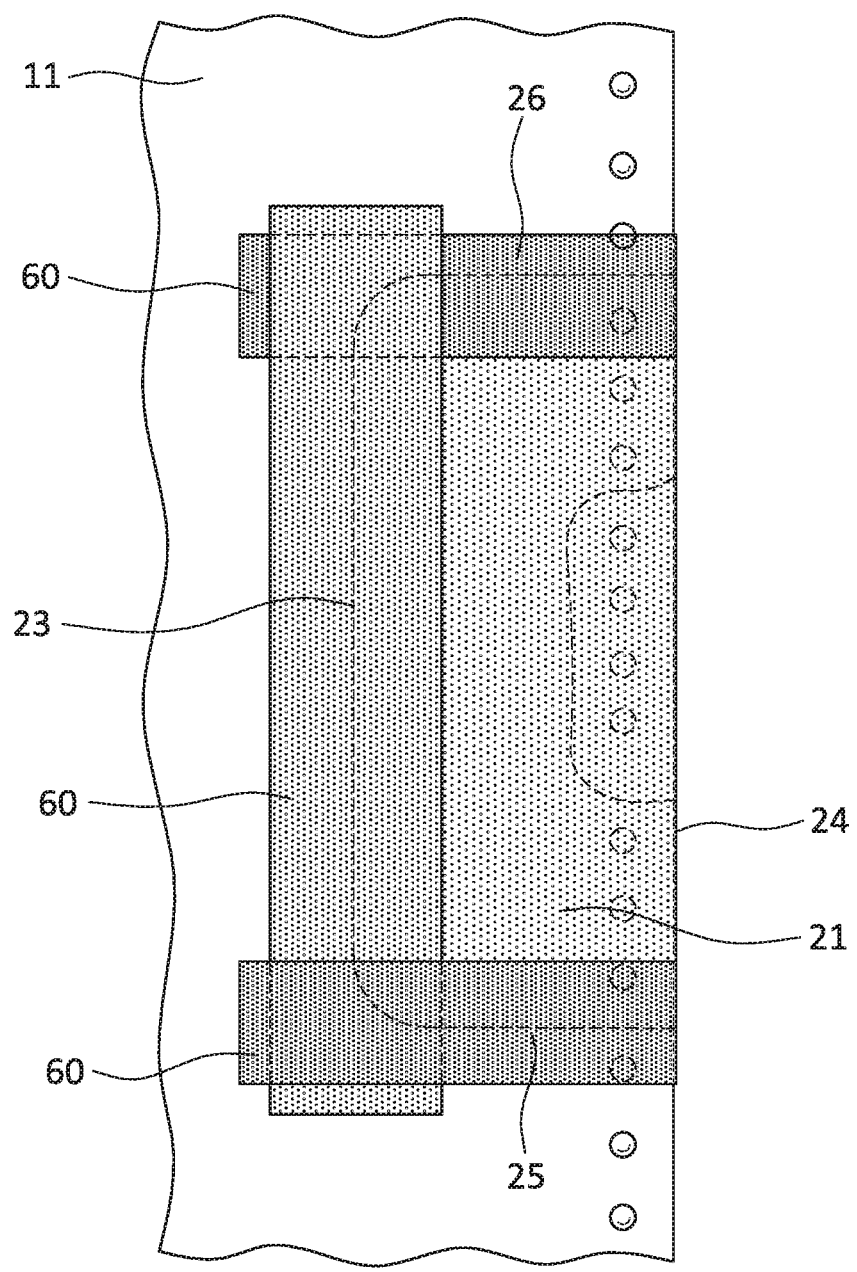
FIG. 5 is a schematic side view of a first doubler plate attached to and positioned on a member with tape attached along edges of the first doubler plate.

The repair assembly 20 can also include tape 60 along one or more of the outer edges 23, 24, 25, 26. The tape 60 can secure the repair assembly to the member 11 and can also provide an aerodynamic transition. FIG. 5 illustrates a repair assembly 20 with tape 60 positioned along the leading edges 23 and lateral edges 25, 26. The tape 60 includes a width that extends across the edges 23, 25, 26 and contacts against both the member 11 and repair assembly 20. The tape 60 includes an adhesive on a first side that contacts against and secures the tape 60.

Figure 6:
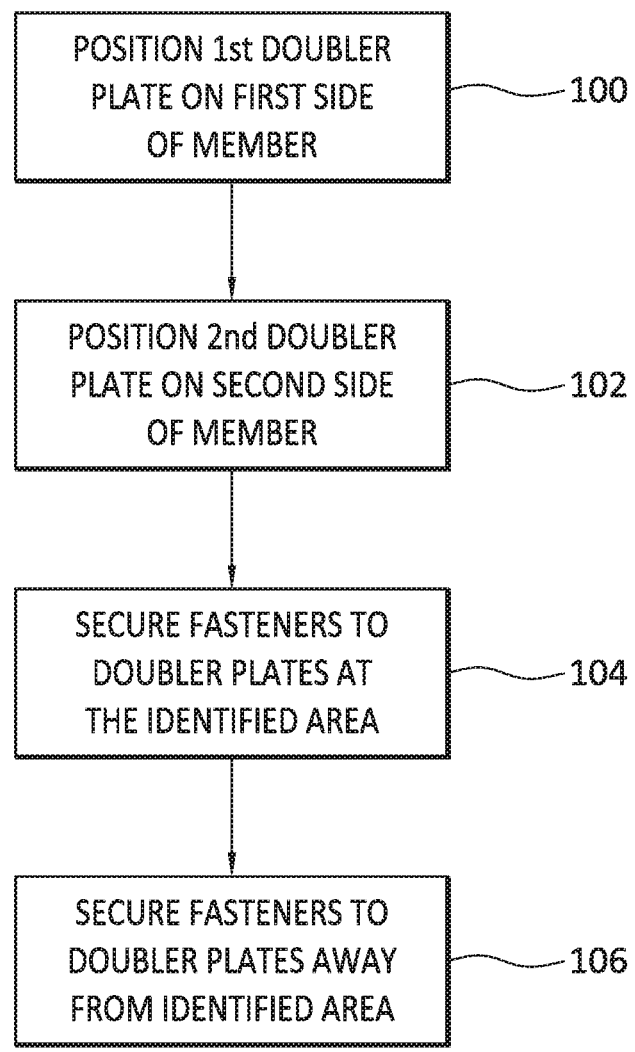
FIG. 6 is a flowchart diagram of a method of repairing an identified area on a member of a vehicle.

FIG. 6 illustrates the steps of a method of repairing an identified area 19 on a member 11 of a vehicle 10. The method includes positioning a first doubler plate 21 over a first side of the identified area 19 of the member 11 (block 100). A second doubler plate 22 is positioned over an opposing second side of the identified area 19 of the member 11 (block 102). A first set of fasteners 30 is inserted through and secured to the first and second doubler plates 21, 22 at the identified area 19 (block 104). A second set of fasteners 30 is inserted through and secured to the first and second doubler plates 21, 22 at points away from the identified area 19 (block 106).

Figure 7:
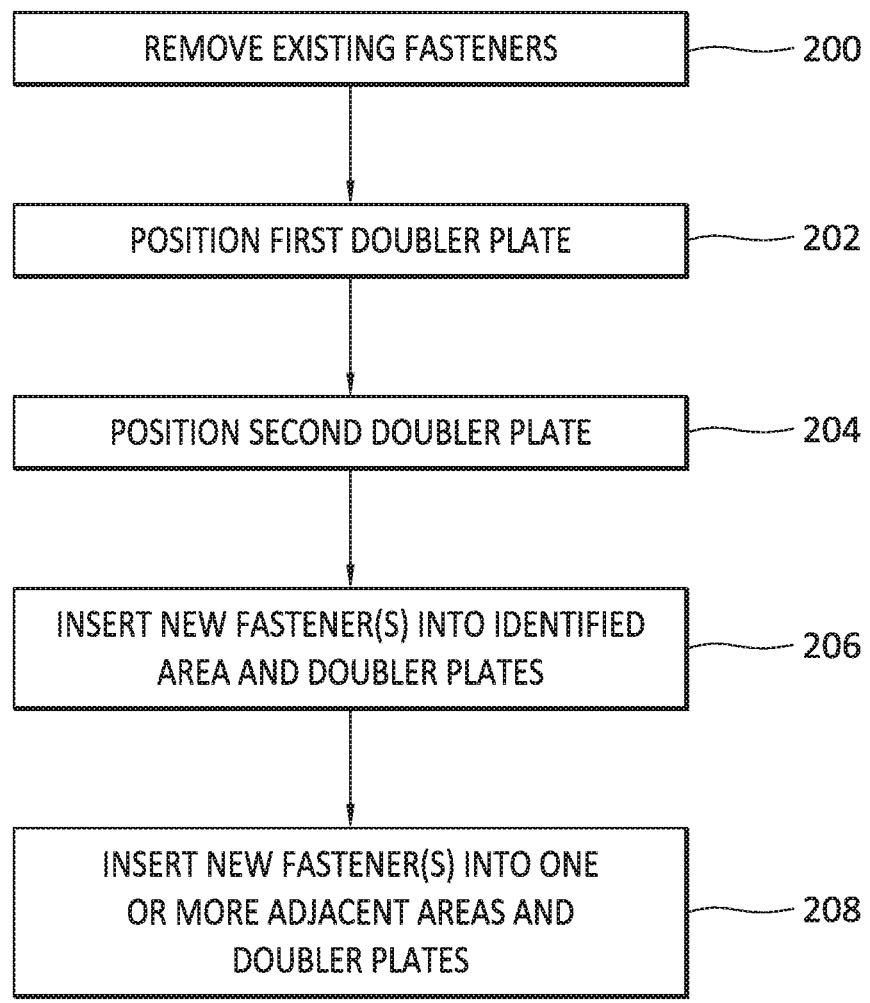
FIG. 7 is a flowchart diagram of a method of repairing an identified area on a member of a vehicle.

The repair assembly 20 can be attached using one or more of the same structural aspects already existing on the member 11. For example, fastener holes 70 in the member 11 can be reused when attaching the repair assembly 20. FIG. 7 illustrates a method of repairing a member 11 that has an identified area 19. The member 11 includes a series of holes 70 that each has a fastener 30. In one example, the member 11 includes first and second panels 12, 13 and the fasteners 30 extend through the holes 70 and connect the first and second panels 12, 13 together.

The repair method includes removing the existing fasteners 30 from the member 11 (block 200). These existing fasteners extend through holes 70 in first and second panels 12, 13 of the member 11 and were in the member 11 when the event occurred. The fasteners 30 are removed from both the identified area 19 and one or more adjacent areas. The number of fasteners 30 that are removed depends upon the extent of the identified area 19. The fasteners 30 are removed from the identified area 19. The identified area 19 can implicate one or more of the panels 12, 13. In one example, the identified area 19 includes the holes 70 that receive the fasteners 30. In another example, the identified area 19 includes one of the edges of the member 11, such as the trailing edge 90.

The fasteners 30 are also removed from one or more adjacent areas 80 that are adjacent to the identified area 19. The adjacent areas 80 can include a predetermined size. For example, the adjacent areas 80 can include a 6 inch length that extends from the point of visible damage to the member 11. In another example, the adjacent areas 80 can include a predetermined number of fasteners 30. For example, an adjacent area 80 includes three fasteners 30.

A first doubler plate 21 is positioned on a first side of the member 11 (block 202). A second doubler plate 22 is positioned on an opposing second side of the member 11 (block 204). The doubler plates 21, 22 are sized with each extending over the identified area 19 and one or more adjacent areas 80 of the member 11. One or more new fasteners 30 are inserted through the holes 70 in the identified area 19 of the first and second panels 12, 13 and each of the first and second doubler plates and secured (block 206). One or more new fasteners 30 are also inserted through the holes in the first and second panels 12, 13 at the one or more adjacent areas and secured (block 208).

An advantage of the repair assembly 20 is the ability to repair the identified area 19 while the vehicle 10 is located away from a repair facility. For example, to repair an aircraft 10 while it is at a remote airport or a spacecraft while in orbit. The repair assembly 20 can include materials that are available where the vehicle 10 is located at the time of the event and/or that are found within the vehicle 10. For example, materials may be available at the remote facility. In another example, the repair assembly 20 can be carried in the interior of the vehicle 10 for use in the event of an issue (e.g., to repair a spacecraft while in space). This provides for the vehicle 10 to remain in service and/or finish a project prior to being moved to the repair facility for permanent repairs.

Figure 8:
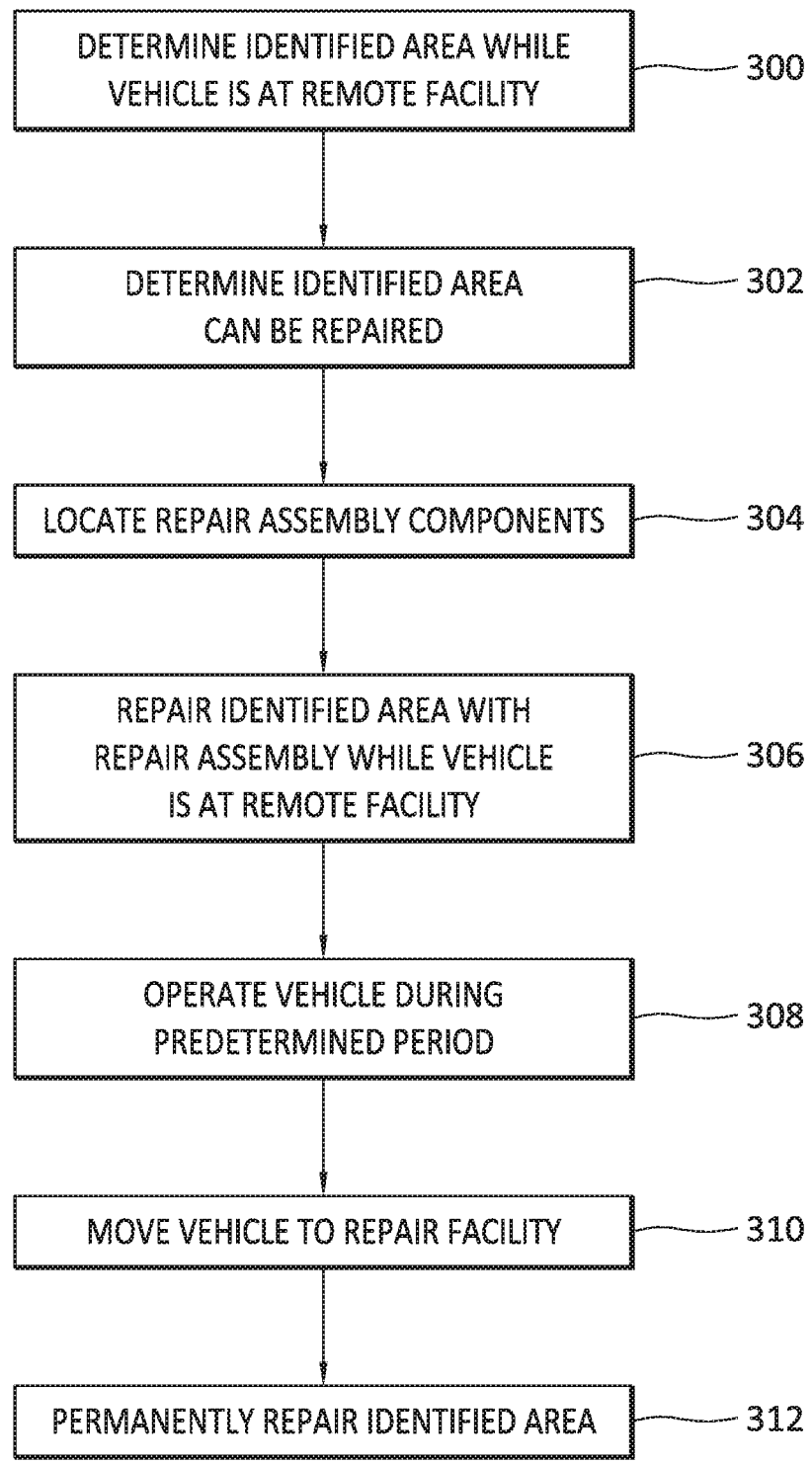
FIG. 8 is a flowchart diagram of a method of operating a vehicle.

FIG. 8 illustrates a method of using the repair assembly 20 in the field to repair a vehicle to allow for its continued use. The need for the repair assembly 20 occurs when it is determined that a vehicle 10 is in need of repair while at a remote location (block 300). This can occur while the vehicle 10 is in operation or when the vehicle 10 has returned to a facility, such as an airport. The identified area 19 can be determined based on a visual inspection of the vehicle 10 and/or one or more tests that can be performed on the vehicle 10. In one example, a vehicle 10 is struck by lightning during flight, and the extent of the damage to the member 11 is determined once the vehicle 10 lands at an airport.

The method includes determining that the identified area 19 can be repaired using the repair assembly 20 (block 302). This can include determining where the identified area 19 is located on the member 11. For example, an identified area 19 at a trailing edge 90 of a member 11 may be applicable for repair, while an identified area 19 on a leading edge may not be applicable for repair. This can also include accessing the extent of the issue. For example, the repair assembly 20 may be applicable when the identified area 19 is isolated to the outer skin 16 of the panels 12, 13, but may not be applicable when the identified area 19 extends to the control mechanism that position and control the movement of the member 11.

When the identified area 19 is applicable for repair, the components of the repair assembly 20 are located (block 304). These components can include metal sheets that form the first and second doubler plates 21, 22 and fasteners 30 that secure the doubler plates 21, 22 to the member 11. One or more of adhesive 40, tape 60, and washers 50 can also be located as needed to complete the repair. Each of these components may be found in a basic maintenance shop where the vehicle 10 is located. These components do not include specialty parts that are difficult to locate or require special ordering.

In one example, one or more of the components can be removed from other sections of the vehicle 10. For example, an interior wall of the vehicle 10 can be removed and used as one or more of the doubler plates 21, 22. This may be necessary when the repairs are needed at a time when components cannot be otherwise located (e.g., while the vehicle 10 is in space).

Once the components are located, the repair assembly 20 is attached to the identified area 19 of the vehicle 10 (block 306). The attachment of the repair assembly 20 includes the one or more processes described above. The repair assembly 20 can be tested to ensure that the repairs are effective. The testing can include one or more of a visual test to ensure the identified area 19 is fully covered by the doubler plates 21, 22, and operation of the member 11 such as moving it within the range of normal movement to ensure that the movement is not constrained in some manner.

The vehicle 10 is operated with the repair assembly 20 connected to the identified area 19 (block 308). The member 11 can perform in a similar manner as it did prior to the issue. The repair assembly 20 and identified area 19 can be inspected on a regular basis during use of the vehicle 10. This can include inspection after each use (e.g., after each flight of an aircraft 10), or after a predetermined amount of use (e.g., after each day or week or service).

The repair assembly 20 is a temporary repair of the identified area 19. The amount of use that is available for the vehicle 10 after repair can be determined at the time the repair assembly 20 is connected to the vehicle 10. For example, the repair assembly 20 has a known limited life of a predetermined number of flights of an aircraft 10 or a limited amount of time that the aircraft is in flight. The limited life can also include a time period (e.g., three months of regular use of the vehicle). The amount of use can also be determined based on the post-repair inspections. These inspections can be used to determine the available life, or to adjust the amount of time based on a previous determination.

While the repair assembly 20 is still effective and the vehicle 10 is in use, the vehicle 10 is moved to a repair facility (block 310). For example, an aircraft 10 can be flown from a remote airport to a repair facility that includes more extensive equipment that is able to fully repair the identified area 19. The use of the repair assembly 20 provides for the vehicle 10 to travel to the repair facility under its own power and without the need for other equipment. Once at the repair facility, the identified area 19 can be permanently repaired (block 312). This can include replacing the member 11, or more permanently attaching repair components to the vehicle 10.

In the various methods, the doubler plates 21, 22 include holes that are aligned with the holes 70 on the member 11. The fasteners 30 can then be inserted through the aligned holes to connect the doubler plates 21, 22 to the member 11. In another example, the doubler plates 21, 22 are positioned along the member 11 at the identified area 19. Holes are formed in the doubler plates 21, 22 at positions to align with the holes 70 in the member 11. Fasteners 30 can then be inserted to connect these elements together.

In the various methods, the first set of fasteners 30 is inserted and secured to the member 11 at the identified area 19 before the second set of fasteners 30 is secured to the one or more adjacent areas 80. In another example, the order is reversed with fasteners 30 secured to the one or more adjacent areas 80 followed by fasteners 30 secured to the identified area 19.

The repair assemblies 20 and methods can be used in a variety of vehicles 10. The repair provides for the vehicles 10 to be repaired for continued use until more permanent repairs can be scheduled and obtained. One example of a vehicle 10 is a commercial aircraft used for transporting passengers and/or cargo. Other vehicles 10 include but are not limited to unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

The present invention can be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of repairing an identified area on a flight control member of an aircraft, the method comprising:
   positioning a first doubler plate over a first side of the identified area of the flight control member;

positioning a second doubler plate over an opposing second side of the identified area of the flight control member;
extending a first plurality of fasteners through the identified area and each of the first and second doubler plates and securing the first plurality of fasteners; and
extending a second plurality of fasteners through each of the first and second doubler plates and the flight control member at points away from the identified area and securing the second plurality of fasteners.

2. The method of claim 1, further comprising applying an adhesive between each of the first and second doubler plates and the flight control member and securing the first and second doubler plates to the flight control member.

3. The method of claim 2, further comprising forming a ramp with the adhesive at leading edges of the first and second doubler plates.

4. The method of claim 1, further comprising aligning a trailing edge of each of the first and second doubler plates with a trailing edge of the flight control member.

5. The method of claim 1, further comprising:
positioning leading edges of each of the first and second doubler plates outward beyond a front edge of the identified area; and
positioning first and second lateral edges of each of the first and second doubler plates outward beyond lateral edges of the identified area.

6. The method of claim 1, further comprising positioning washers along each of the first plurality of fasteners at the identified area.

7. The method of claim 1, further comprising aligning each of the first and second plurality of fasteners in a straight line along a trailing edge of the flight control member.

8. A method of repairing an identified area on a flight control member of an aircraft, the method comprising:
removing existing fasteners from an identified area and one or more adjacent areas of the flight control member, the existing fasteners extending through holes in the flight control member;
positioning a first doubler plate on a first side of the flight control member and a second doubler plate on an opposing second side of the flight control member with each of the first and second doubler plates extending over the identified area and the one or more adjacent areas of the flight control member;
inserting one or more new fasteners through the holes in the identified area and the first and second doubler plates and securing the first and second doubler plates to the flight control member; and
inserting one or more of the new fasteners through the holes in the one or more adjacent areas of the flight control member and the first and second doubler plates and securing the first and second doubler plates to the flight control member.

9. The method of claim 8, further comprising aligning holes in the first and second doubler plates with the holes in the flight control member and inserting the new fasteners through the aligned holes.

10. The method of claim 8, further comprising aligning each of the new fasteners in a straight line along the flight control member.

11. The method of claim 8, further comprising inserting washers along each of the one or more new fasteners in the identified area and not along the one or more new fasteners in the one or more adjacent areas.

12. The method of claim 8, further comprising aligning trailing edges of each of the first and second doubler plates with a trailing edge of the flight control member.

13. The method of claim 8, further comprising applying an adhesive between each of the first and second doubler plates and the flight control member prior to securing the new fasteners.

14. The method of claim 8, further comprising positioning a head of one or more of the new fasteners outward beyond a surface of the flight control member.

15. The method of claim 8, further comprising applying tape over a leading edge of each of the first and second doubler plates and adhering a first section of the tape to the flight control member and a second section of the tape to the first and second doubler plates respectively.

16. A repair assembly that extends over first and second opposing sides of an identified area of a flight control member of an aircraft, the repair assembly comprising:
first and second doubler plates configured to be positioned on the first and second opposing sides of the flight control member and sized to extend over the identified area and one or more adjacent areas, each of the first and second doubler plates comprising:
a leading edge;
a trailing edge;
holes aligned in a row along the trailing edge; and
fasteners sized to extend through the holes of each of the first and second doubler plates and the flight control member, the fasteners comprising a head that is larger than the holes;
wherein the holes of each of the first and second doubler plates have a common spacing for the holes of the first doubler plate to align with the holes of the second doubler plate when the first doubler plate is positioned on the first side of the flight control member and the second doubler plate is positioned on the second side of the flight control member.

17. The repair assembly of claim 16, further comprising an adhesive positioned between the first doubler plate and the first side of the flight control member and the second doubler plate and the second side of the flight control member.

18. The repair assembly of claim 16, further comprising washers positioned on the fasteners that extend through the identified area of the flight control member.

19. The repair assembly of claim 16, further comprising a ramp positioned at the leading edge of each of the first and second doubler plates, the ramp forming an aerodynamic transition between the repair assembly and the flight control member.

20. The repair assembly of claim 16, wherein each of the first and second doubler plates comprise an equal shape and size.

* * * * *